ized Patent [19]

Brook et al.

[11] 4,383,059
[45] May 10, 1983

[54] WATER DILUTABLE EPOXY COATING COMPOSITIONS

[75] Inventors: Basil W. Brook, Coventry; Frank Reeder, Whitburn, both of England

[73] Assignee: The International Paint Company Limited, London, England

[21] Appl. No.: 304,645

[22] Filed: Sep. 23, 1981

[30] Foreign Application Priority Data

Oct. 6, 1980 [GB] United Kingdom ............... 8032084

[51] Int. Cl.³ .............................................. C08L 63/02
[52] U.S. Cl. .................................... 523/412; 525/107
[58] Field of Search ................ 260/29.6 R; 525/187; 524/460, 114; 523/412

[56] References Cited

U.S. PATENT DOCUMENTS

| 3,969,300 | 7/1976 | Nagata et al. | 427/410 |
| 4,028,294 | 6/1977 | Brown et al. | 260/29.6 R |
| 4,212,781 | 7/1980 | Evans et al. | 428/460 |
| 4,246,148 | 1/1981 | Shimp et al. | 428/413 |

FOREIGN PATENT DOCUMENTS

| 6334 | of 0000 | European Pat. Off. |
| 6336 | of 0000 | European Pat. Off. |
| 1407410 | 4/1975 | United Kingdom |
| 1532640 | 11/1978 | United Kingdom |
| 2038336 | 7/1980 | United Kingdom |
| 2059968 | 4/1981 | United Kingdom |
| 2067202 | 7/1981 | United Kingdom |

Primary Examiner—Joseph L. Schofer
Assistant Examiner—N. Sardfim
Attorney, Agent, or Firm—Steele, Gould & Fried

[57] ABSTRACT

A coating composition comprises a water dilutable dispersion of (a) the reaction product of an epoxy resin with a primary or secondary amine and (b) a polymer containing free carboxyl groups. The epoxy resin and amine are preferably reacted in an organic solvent and a solution of the reaction product is mixed with a solution of the carboxyl-containing polymer (b) in an amount sufficient to provide an excess of free carboxyl groups over the amine groups in the epoxy resin reaction product (a). The coating composition is preferably applied to a substrate in the form of an aqueous dispersion in which (a) and (b) are held in stable dispersion by a base such as ammonia or an amine.

15 Claims, No Drawings

WATER DILUTABLE EPOXY COATING COMPOSITIONS

This invention relates to a water dilutable coating composition based on an epoxy resin. Epoxy resins are capable of forming tough coatings which are highly resistant to hydrolysis and to chemical attack. Coatings exhibiting particularly high resistance to hydrolysis are for example required for internal coatings for food and beverage cans which may have to withstand heating in contact with acid aqueous liquids such as fruit juices or beer. The coating should not hydrolyse to release any substances which might impair the flavour of the food or beverage and should adhere sufficiently strongly to the can, which is usually of tinplate or aluminium, to withstand the conditions imposed during pasteurisation of the food or beverage.

It is, however, difficult to produce coating compositions containing epoxy resin in a water dilutable form. Coatings based on volatile organic solvents are being regarded with increasing disfavour as the evaporated solvent causes atmospheric pollution and the cost of organic solvents is rapidly increasing. The present invention seeks to provide a coating composition based on an epoxy resin and wholly or mainly using water as a solvent.

U.S. Pat. No. 4,212,781 describes a coating composition based on a graft polymer formed by reacting together an epoxy resin and addition polymerisable monomers including carboxylic acid in the presence of at least 3 percent by weight of benzoyl peroxide. The epoxy resin is grafted at aliphatic backbone carbon atoms with an addition polymer component. European Patent Applications Nos. 0,006,334 and 0,006,336 describe a coating composition based on the hydroxy ester reaction product of an acidic copolymer and an epoxy resin. The processes of this patent and these patent applications can provide water dilutable coating compositions which are resistant to hydrolysis but their adhesion to metals, particularly tinplate, can be unsatisfactory. Moreover, great care is required in the manufacture of the above-discussed coating compositions. The graft polymerisation reaction and/or the formation of linkages between the acidic copolymer and the epoxy resin can form crosslinks between epoxy resin molecules. This can cause irreversible gelation of the coating composition.

Amine-substituted epoxy resins formed by reaction of an epoxy resin with a secondary amine are known as cationic resins for electropaints and are described for example in British Pat. No. 1,407,410 and British Patent Application No. 2,038,336. For this purpose the amine-substituted epoxy resin is neutralised by a monomeric acid such as acetic acid.

The present invention seeks to provide a water dispersible coating composition which adheres well to tinplate and aluminium and has good resistance to hydrolysis and which can be prepared with less risk of gelation than the above-discussed coating compositions.

A coating composition according to the invention comprises a water dilutable dispersion of (a) the reaction product of an epoxy resin with a primary or secondary amine and (b) a polymer containing free carboxyl groups present in an amount sufficient to provide an excess of free carboxyl groups over the amine groups in the epoxy resin reaction product.

The coating composition of the invention can be in the form of an aqueous dispersion in which the polymers (a) and (b) are held in stable dispersion by a base such as ammonia or an amine. The epoxy resin is held in stable dispersion at least partly by ionic interaction between the amine groups in the epoxy resin reaction product and the carboxylic groups in the polymer (b). There is substantially less covalent bonding between the epoxy resin and the carboxyl-containing polymer than is obtained by the grafting process of U.S. Pat. No. 4,212,781 or by the esterification process of European Patent Applications Nos. 0,006,334 and 0,006,336. This substantially reduces the risk of gelation in the aqueous coating composition. Moreover, if some gel is formed it can be redispersed by the addition of further monomeric amine.

The amine which is reacted with the epoxy resin is preferably a secondary amine such as diethanolamine, diethylamine, N-ethylethanolamine, N-methyl propanolamine or N-methylethanolamine. The secondary amine reacts with the epoxy resin to introduce tertiary amine substituent groups on the epoxy resin.

The epoxy resin reacted with the secondary amine preferably has a molecular weight of at least 1,000 most preferably 2,000 to 15,000. Such high molecular weight epoxy resins are incompatible with most carboxyl-containing polymers, that is even if both resins are soluble in the same organic solvent, the solutions do not dissolve in one another and tend to separate. The epoxy resin preferably has an epoxy molar mass of 1,000 to 8,000, most preferably 2,000 to 5,000 and preferably consists mainly of diepoxides. Examples of suitable epoxy resins are condensed glycidyl ethers of bisphenols such as 2,2-bis(4-hydroxy-phenyl)propane, known as bisphenol A.

A primary amine, for example ethanolamine, can be used as an alternative to or in conjunction with the secondary amine for reaction with the epoxy resin. The primary amine reacts with the epoxide groups to introduce secondary amine groups into the epoxy resin. These secondary amine groups may take place in further reactions with epoxy groups increasing the molecular weight of the epoxy resin component of the coating composition.

The amine can be used in an amount equivalent to 10 percent or more of the epoxide groups in the epoxy resin. Preferably the amine is used at 40 to 100 percent of equivalents based on epoxide groups. If less than the equivalent amount of amine is used some of the epoxide groups of the epoxy resin are retained in the reaction product. The amine can, if desired, be used ;in stoichiometric excess; free amine remaining in the reaction product will eventually serve to neutralise and solubilise part of the carboxyl-containing polymer (b).

The reaction between the epoxy resin and the amine is preferably carried out by heating the reactants at 50° to 150° C. in an organic solvent, for example an alcohol such as methanol, ethanol, isopropanol or butanol, an ether alcohol such as 2-ethoxyethanol, 2-methoxyethanol or 2-butoxyethanol, an ester such as ethyl acetate or butyl acetate and/or an aromatic hydrocarbon such as xylene or toluene.

The carboxyl-containing polymer (b) is preferably an addition polymer of an olefinically unsaturated carboxylic acid, for example acrylic acid, methacrylic acid, maleic acid, itaconic acid or citraconic acid. The olefinically unsaturated acid is preferably copolymerised with at least one olefinically unsaturated comonomer, for example an acrylic ester such as methyl methacrylate, butyl acrylate, ethyl acrylate, propyl acrylate, propyl methacrylate, butyl methacrylate, hexyl methacrylate, 2-hydroxypropyl acrylate, 2-hydroxyethyl acrylate or 2-hydroxypropyl methacrylate, acrylamide, methacrylamide, styrene or alpha-methyl styrene. The copolymer preferably contains 20 to 80 percent by weight of the unsaturated carboxylic acid units. The copolymer is preferably prepared by polymerisation in an organic solvent, for example one or more of the solvents listed above.

The coating composition of the invention can be formed by mixing a solution of the carboxyl-containing polymer (b) with a solution of the reaction product of the epoxy resin and amine. The two compositions can be mixed as solutions in organic solvents or the acrylic polymer can be used in the form of an aqueous solution containing ammonia or an amine to neutralise the free carboxyl groups partially. The two solutions need not be heated together to form a coating composition although they may be warmed to promote thorough mixing of the solutions. The solutions can be heated to promote esterification of epoxy groups by carboxyl groups of the polymer (b) if the epoxy resin contains unreacted epoxy groups. The amine groups substituted on the epoxy resin catalyse the esterification of the unreacted epoxy groups.

The carboxyl-containing polymer (b) and the reaction product of the epoxy resin and amine are mixed in proportions to give an excess of free carboxyl groups over amine groups in the epoxy resin reaction product. There is preferably an excess of free carboxyl groups over the sum of amine groups and unreacted epoxy groups in the epoxy resin reaction product, most preferably by a factor of 1.5:1 to 20:1. The epoxy resin is preferably of much higher equivalent weight than the carboxyl-containing copolymer so that the epoxy resin reaction product provides at least 40 percent by weight of the resin solids in the coating composition, most preferably 60 to 85 percent by weight.

After the carboxyl-containing polymer has been mixed with the amine-substituted epoxy resin, ammonia or an amine is generally added to neutralise at least partially the excess of free carboxyl groups. The ammonia or amine can be added undiluted to the coating composition in a water miscible solvent or an aqueous solution of the ammonia or amine can be used. Tertiary amines are preferred, for example dimethylaminoethanol, diethylaminoethanol, triethylamine, triethanolamine, N-ethyl morpholine or 2-(N,N-dimethylamino)-2 methyl propanol. When the reaction product of the epoxy resin and the amine contains unreacted epoxy groups, heating to promote the esterification of these epoxy groups by the carboxylic acid groups of the polymer (b) can take place before or after the addition of the solubilising amine.

Amine neutralisation renders the carboxyl-containing polymer water soluble and the dissolved carboxyl-containing polymer holds the reaction product of the epoxy resin and primary or secondary amine in a stable water dilutable dispersion. The coating composition of the invention, in which the epoxy resin is held in stable dispersion at least partly by ionic attraction between the carboxyl groups of the copolymer and the amine groups substituted on the epoxy resin, generally has a lower viscosity at equal solids concentration compared to the compositions described in U.S. Pat. No. 4,212,781 and European Patent Applications Nos. 0,006,334 and 0,006,336. This allows a higher solids coating composition to be applied using conventional spray equipment, thus reducing the energy required for driving off water and any cosolvent present. Alternatively a carboxyl-containing acrylic polymer can be used which has a higher molecular weight than those used in the prior art and thus better film forming properties.

The coating composition is generally obtained in the form of a smooth white dispersion after water has been added. This dispersion can be further diluted with water to the required viscosity without precipitating any part of the resins of the coating composition. If desired the organic solvent used in the preparation of the coating composition can be wholly or partly removed from the composition and recovered before it is applied to the substrate. For example, if ethyl acetate or xylene has been used as part of the organic solvent it can be removed by azeotropic distillation.

The coating composition can contain an aminoplast region to give additional cross-linking of the coating on curing. The aminoplast resin can be added to the coating composition before or after the neutralisation and dilution steps. Examples of suitable aminoplast resins are melamine formaldehyde resins particularly those consisting mainly of hexamethoxy methyl melamine, urea formaldehyde resins and benzoguanamine formaldehyde resins. These aminoplast resins react with carboxylic acid groups in the polymer (B) and with hydroxyl groups on the epoxy resin formed during the reaction with the secondary amine.

The coating composition of the invention is particularly suitable for coating the inside surface of food and beverage cans including cans for fruit juice and beer. The coatings have excellent adhesion to tinplate and aluminium and resist hydrolysis during pasteurisation, even of acidic foodstuffs and beverages. The coating composition is preferably applied as a spray, for example at a solids concentration of 15 to 30 percent by weight, but can also be applied by dip-coating or anionic electrocoating. The coating is preferably heated at 100° C. to 240° C. for 1 to 20 minutes to effect curing, temperatures of at least 140° C. being preferred if the coating composition contains no aminoplast resin.

The invention is illustrated by the following Examples

EXAMPLE 1

A carboxyl-containing acrylic copolymer was prepared from the following ingredients:

| Methacrylic acid | 1445 g |
| Styrene | 858 g |
| Ethylacrylate | 811 g |
| Butan-1-ol solvent | 2885 g |
| Ethyl acetate solvent | 2885 g |
| Benzoyl peroxide | 78 g |

The monomers, solvents and initiator were mixed and 690 ml of the mixture was added to a 10 liter flask held at 97° C. After 15 minutes the remainder of the monomer mixture was gradually added, over a period of 18 minutes. A slow reflux was maintained during the addition of the monomer mixture and for four hours thereafter. An acrylic copolymer was formed having an intrinsic viscosity measured in butanol at 25° C. of 0.144.

1,000 g of an epoxy resin was dissolved in a solvent mixture of 550 g of ethyl acetate, 300 g of 2-butoxyethanol and 100 g of butanol. The epoxy resin was a condensed glycidyl ether of bisphenol A consisting mainly of diepoxides and having an epoxy molar mass of 2640. 40 g of diethanolamine was added to the solution in three equal portions over 30 minutes with stirring. The solution was then heated under reflux at 86° C. for a further 75 minutes. The amount of diethanolamine added was a stoichiometric amount to react with the epoxide groups of the epoxy resin.

715 g of the acrylic resin solution was added to the reaction product of the epoxy resin and amine with stirring followed by 25 g of dimethylaminoethanol. The weight ratio of epoxy resin reaction product to acrylic copolymer was 4:1. The ethyl acetate solvent in the coating composition formed was replaced with water by gradually adding water while distilling off the ethyl acetate. The resulting aqueous dispersion was poured into two liters of water with agitation to yield a coating composition containing 26 percent by weight of solids. This coating composition was a stable dispersion.

The coating composition was applied to tinplate at a dry film thickness of 6 microns using a bar coater. The coated tinplate was heated in an oven at 200° C. for two minutes to cure the coating. A uniform hard glossy coating was obtained. The adhesion of the coating to the tinplate was tested by a cross-hatch test in which two sets of ten parallel lines, with adjacent lines in each set spaced apart by 3 mm and with the lines of one set intersecting the lines of the other set approximately at right angles, are cut in the cured coating through to the substrate to isolate a pattern of 3 mm squares between the cuts. Adhesive tape is firmly applied to the cut area and then peeled off. The coating is then examined to see how many of the isolated squares have been pulled off by the adhesvie tape. In the present case, first and second cross-hatched patterns were cut in the cured coating on the tinplate and the first of these patterns was subjected to the adhesion test. The cured coating gave a 100 percent result (i.e. no coating was removed by the adhesive tape). The coated tinplate was then immersed in water at 80° C. for an hour to simulate the conditions used to pasteurise a food or beverage. No blushing of the coating was observed after this simulated pasteurisation test. A third cross-hatched pattern was then cut in the coating and both the second and third cross-hatched patterns were subjected to the adhesion test. No coating was removed by the adhesive tape from either of the patterned areas.

EXAMPLE 2

A solution of 1,000 g of epoxy resin was prepared as described in Example 1. 19.9 g of diethanolamine was added to the solution in three portions over 30 minutes and the mixture was heated under reflux (86° C.) for a further 75 minutes. The amount of diethanolamine used was sufficient to react with 50 percent of the epoxide groups of the epoxy resin.

715 g of the acrylic copolymer solution prepared in Example 1 was added to the reaction product of the epoxy resin and amine followed by 40 g of dimethylaminoethanol. The mixture was then heated at reflux with stirring for 3 hours to effect some esterification of the carboxyl groups of the acrylic copolymer with epoxide groups which had not reacted with the diethanolamine. The ethyl acetate solvent was then replaced by water as described in Example 1 and the resulting mixture was poured into water with agitation to produce a coating composition in the form of a stable aqueous dispersion containing 29.5 percent by weight of resin solids.

The coating composition was applied to tinplate and heat cured as described in Example 1. A uniform hard glossy coating was obtained which satisfactorily withstood the simulated pasteurisation and adhesion tests described in Example 1.

EXAMPLE 3

An acrylic copolymer was prepared from the following ingredients:

| Methacrylic acid | 964 g |
|---|---|
| Styrene | 572 g |
| Ethylacrylate | 541 g |
| Butanol solvent | 1924 g |
| Benzoyl peroxide | 52 g |

550 ml of the above monomer mixture was added to a 10 liter flask held at 98° C. and the remainder of the monomer mixture was added gradually over 165 minutes. The temperature of the reaction mixture varied between 95° C. to 110° C. during addition of monomers. The mixture was stirred for one hour after all the monomers had been added. A further 26 g of benzoyl peroxide was added and the mixture was held at 97° C. for a further two hours. An acrylic copolymer was formed having an intrinsic viscosity measured in butanol at 25° C. of 0.173.

1,000 g of an epoxy resin was dissolved in a solvent mixture of 550 g of ethyl acetate, 300 g of 2-butoxyethanol and 100 g of butanol and heated to 85° C. The epoxy resin was a condensed glycidyl ether of bisphenol A consisting mainly of diepoxides and having an epoxy molar mass of 3225. 32.2 g of diethanolamine was added dropwise over 25 minutes and the solution was then heated for 75 minutes at 85° C. The amount of diethanolamine used was a stoichiometric amount to react with the epoxide groups of the epoxy resin.

The reaction product of the epoxy resin and amine was cooled to 60° C. and 826 g of the acrylic copolymer solution was added with stirring for 10 minutes. The weight ratio of epoxy resin reaction product to acrylic copolymer was 7:3. 103 g of dimethylaminoethanol was added dropwise over 30 minutes at 60° C. and the resulting mixture was stirred at 60° C. for two hours to form an almost clear orange yellow solution. 1 liter of distilled water at 60° C. was added to the solution to form a white opaque dispersion. Ethyl acetate solvent was stripped from the dispersion by vacuum distillation and 1930 g of water was added. The coating composition formed was a stable aqueous dispersion having a solids content of 29.6 percent by weight.

The coating composition was applied to tinplate and heat cured as described in Example 1. It formed a uniform hard glossy coating with a faintly blue appearance. The coating satisfactorily withstood the simulated pasteurisation and adhesion tests described in Example 1.

EXAMPLE 4

A carboxyl-containing acrylic copolymer was prepared from the following monomer mixture:

| Methacrylic acid | 595 g |
|---|---|
| Styrene | 350 g |
| Ethylacrylate | 279 g |
| Butan-1-ol solvent | 1775 g |

| -continued | |
|---|---|
| Benzoyl peroxide | 32.6 g |

300 ml of the above mixture was added to a 5 liter flask held at 97° C. and heated to reflux. The remainder of the monomer mixture was then gradually added, over a period of 94 minutes. A slow reflux was maintained during the addition of the monomer mixture and for two hours thereafter. A further 16.3 g of benzoyl peroxide was then added and the mixture was refluxed for a further 105 minutes. An acrylic copolymer was formed having an intrinsic viscosity measured in butanol at 25° C. to 0.143.

1,000 g of the epoxy resin used in Example 3 was dissolved in a solvent mixture of 667 g of butanol, 513 g of 2-butoxyethanol and 213 g of xylene at 121° C. 16.3 g of diethanolamine was added to the solution and heated under reflux at 121° C. for 3 hours. The amount of diethanolamine added was sufficient to react with half the epoxide groups of the epoxy resin.

613 g of the acrylic copolymer solution was added to the reaction product of the epoxy resin and amine with stirring and refluxed at 121° C. for 3 hours to effect some esterification of the carboxyl groups of the acrylic copolymer with epoxide groups which had not reacted with the diethanolamine. The weight ratio of epoxy resin reaction product to acrylic copolymer was 4:1. The solution was cooled and a solution of 62.9 g of dimethylaminoethanol in 75 g of water was added over 20 minutes. 10 minutes later 1875 g of water was added at 60° C. Vacuum distillation was carried out with addition of water to yield a coating composition containing 25 percent by weight of solids at a ratio of water to organic solvents of 2.7:1. This coating composition was a stable white emulsion.

The coating composition was applied to tinplate and heat cured as described in Example 1. A uniform hard glossy coating was obtained which satisfactorily withstood the simulated pasteurisation and adhesion tests described in Example 1.

EXAMPLE 5

142.9 g of the epoxy resin used in Example 3 was dissolved in a solvent mixture of 78.6 g of ethyl acetate, 42.9 g of 2-butoxyethanol and 14.3 g of butanol at 85° C. 1.66 g of N-methylethanolamine was added and heated under reflux at 86° C. for 90 minutes. The amount of N-methylethanolamine added was sufficient to react half the epoxide groups of the epoxy resin.

87.5 g of the acrylic copolymer solution prepared in Example 4 was added to the reaction product of the epoxy resin and amine with stirring followed by 8.98 g of dimethylaminoethanol and refluxed at 86° C. for 3 hours to effect some esterification of the carboxyl groups of the acrylic copolymer with unreacted epoxy groups. The weight ratio of epoxy resin reaction product to acrylic copolymer was 4:1. 292 g of water was added at 60° C. to form an emulsion and 78.6 g of organic solvent (ethyl acetate) was removed by vacuum distillation to yield a coating composition containing 26 percent by weight of solids. This coating composition was a stable dispersion.

The coating composition was applied to tinplate and heat cured as described in Example 1. A uniform hard glossy coating was obtained which satisfactorily withstood the simulated pasteurisation and adhesion tests described in Example 1.

What is claimed is:

1. A coating composition comprising a water-dilutable dispersion of (a) the reaction product of an epoxy resin having an epoxy molar mass of about 1,000 to about 8,000 with a non-tertiary amine in an amount sufficient to provide from about 40 to 100 percent equivalents of amine based on epoxide groups in said epoxy resin, and (b) a polymer containing free carboxyl groups present in an amount sufficient to provide free carboxyl groups in a ratio of about 1.5:1 to about 20:1 based on sum of the amine groups and unreacted epoxy groups in the epoxy resin reaction product (a), said epoxy resin reaction product (a) providing at least about 40 percent, by weight, of the resin solids in the coating composition.

2. A coating composition according to claim 1 in which the epoxy resin has an epoxy molar mass of 2000-5000 and consists mainly of diepoxides.

3. A coating composition according to claim 1 in which the amine is a secondary amine.

4. A coating composition according to claim 3 in which the secondary amine is diethanolamine.

5. A coating composition according to claim 1 in which the carboxyl-containing polymer (b) is an addition polymer of an olefinically unsaturated carboxylic acid.

6. A coating composition according to claim 5 in which the carboxyl-containing polymer (b) is a copolymer containing 20 to 80 percent by weight of the unsaturated carboxylic acid units.

7. A coating composition according to claim 1 in which the epoxy resin reaction product (a) provides 60 to 85 percent by weight of the resin solids in the coating composition.

8. A coating composition according to claim 1 containing an aminoplast resin capable of giving additional cross-linking of the coating on curing.

9. A process for producing a water-dilutable coating composition comprising reacting an epoxy resin having an epoxy molar mass of about 1,000 to about 8,000 with a non-tertiary amine in an amount sufficient to provide from about 40 to 100 percent equivalents of amine based on epoxide groups in said epoxy resin, and mixing a solution of the resulting product (a) in an organic solvent with a solution of a polymer (b) containing free carboxyl groups and present in an amount sufficient to provide a ratio of free carboxyl groups to the sum of the amine groups and unreacted epoxy groups in the epoxy resin reaction product (a) of about 1.5:1 to about 20:1, the epoxy reaction product (a) providing at least 40 percent, by weight, of the resin solids in the coating composition.

10. A process according to claim 9 in which the epoxy resin and the amine are reacted at 50° to 150° C. in an organic solvent.

11. A process according to claim 9 in which the solution of the carboxyl-containing polymer is a solution in an organic solvent and ammonia or an amine is added after it has been mixed with the epoxy resin reaction product to neutralise at least partially the excess of free carboxyl groups.

12. A process according to claim 9 in which the solution of the carboxyl-containing polymer is an aqueous solution containing ammonia or an amine to neutralise partially the free carboxyl groups.

13. A process according to claim 9 in which the epoxy resin is reacted with less than an equivalent amount of amine so that the epoxy resin reaction product contains unreacted epoxide groups, and the epoxy resin reaction product and the carboxyl-containing polymer are heated after mixing to promote esterification of epoxy groups by carboxyl groups.

14. A coating composition according to claim 1 in the form of an aqueous dispersion in which the epoxy resin reaction product (a) and the carboxyl-containing polymer (b) are held in stable dispersion by a base.

15. A process for coating a substrate comprising applying to this substrate a coating composition according to claim 14 and heating it at 100° to 240° C. for 1 to 20 minutes to effect curing of the coating.

* * * * *

UNITED STATES PATENT AND TRADEMARK OFFICE
CERTIFICATE OF CORRECTION

PATENT NO. : 4,383,059
DATED : May 10, 1983
INVENTOR(S) : Brook et al

It is certified that error appears in the above-identified patent and that said Letters Patent are hereby corrected as shown below:

Column 2, line 51, delete "used ;in" and insert --used; in--.

Column 4, line 20, delete "region" and insert --resin--.

Column 4, line 45, after "ples" insert --:--.

Column 5, line 34, delete "adhesvie" and insert --adhesive--.

Column 7, line 14, delete "to" and insert --of--.

Signed and Sealed this

Sixth Day of September 1983

[SEAL]

Attest:

GERALD J. MOSSINGHOFF

Attesting Officer

Commissioner of Patents and Trademarks